Patented Mar. 20, 1934

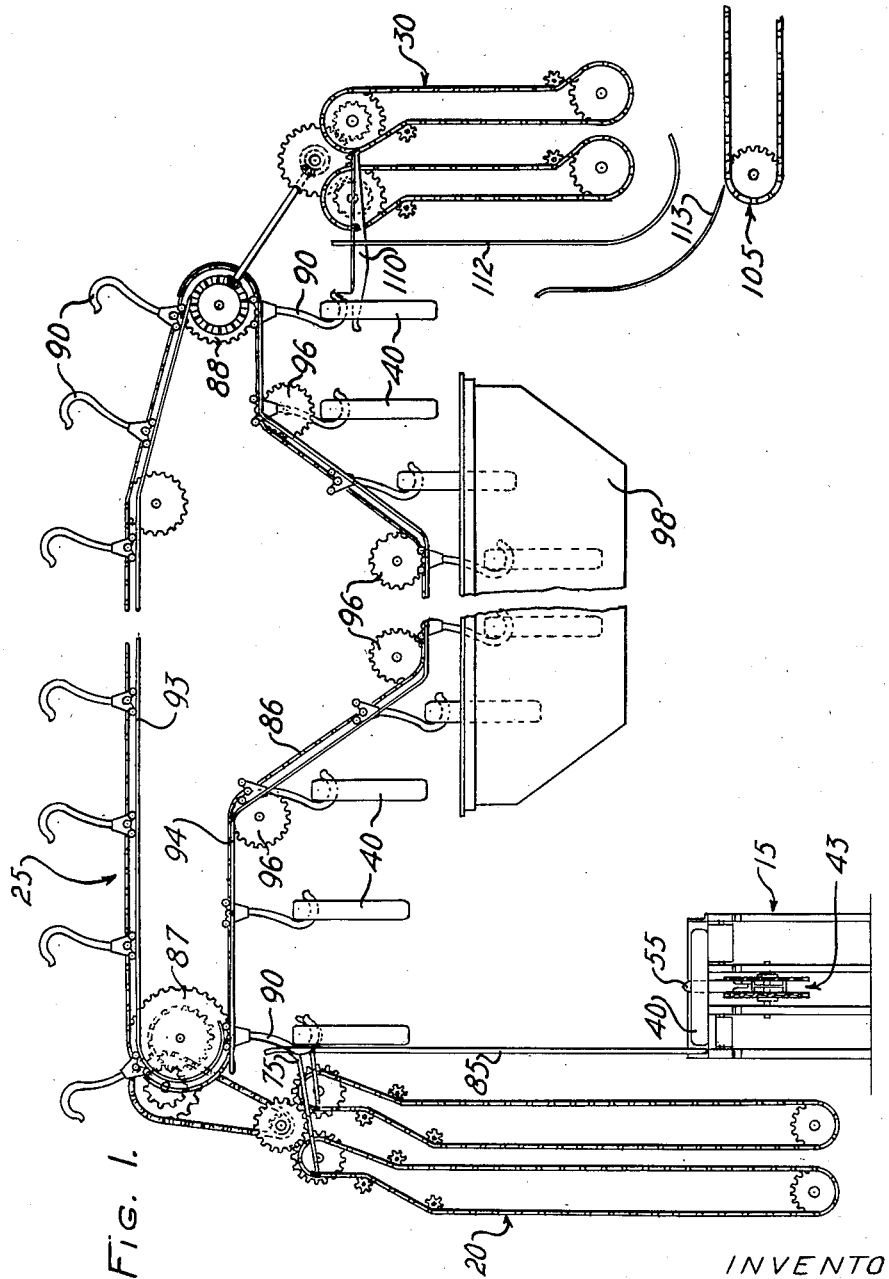

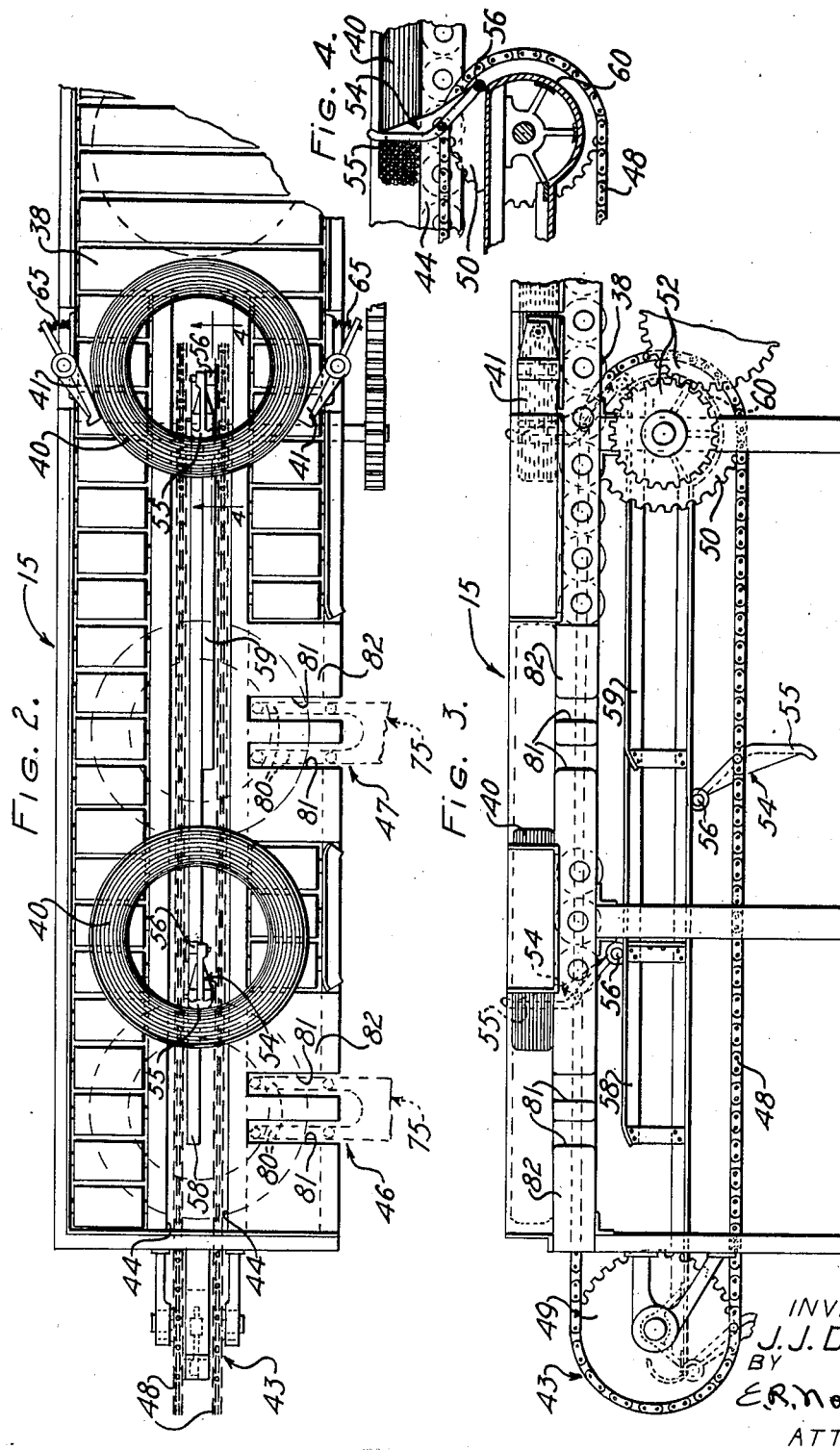

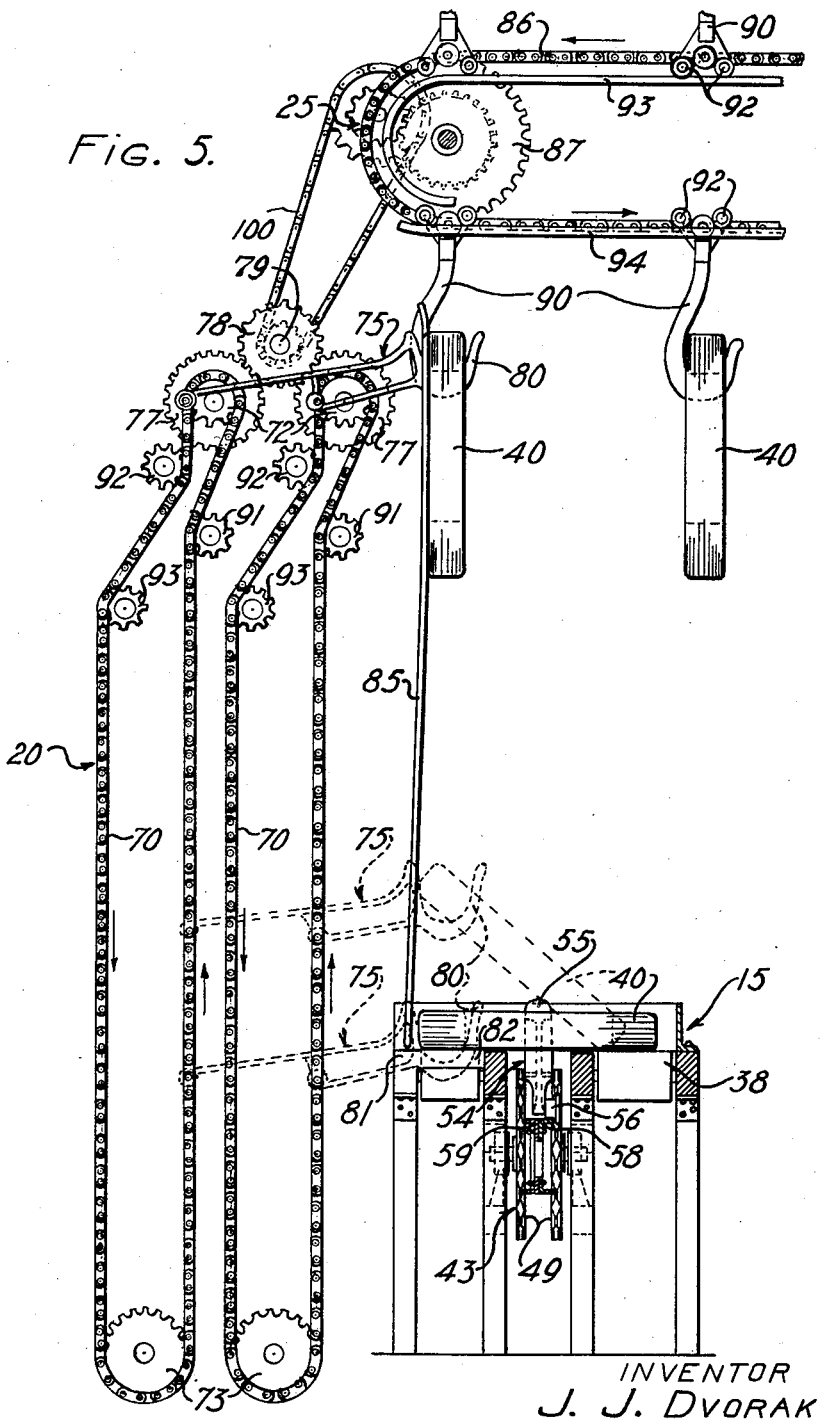

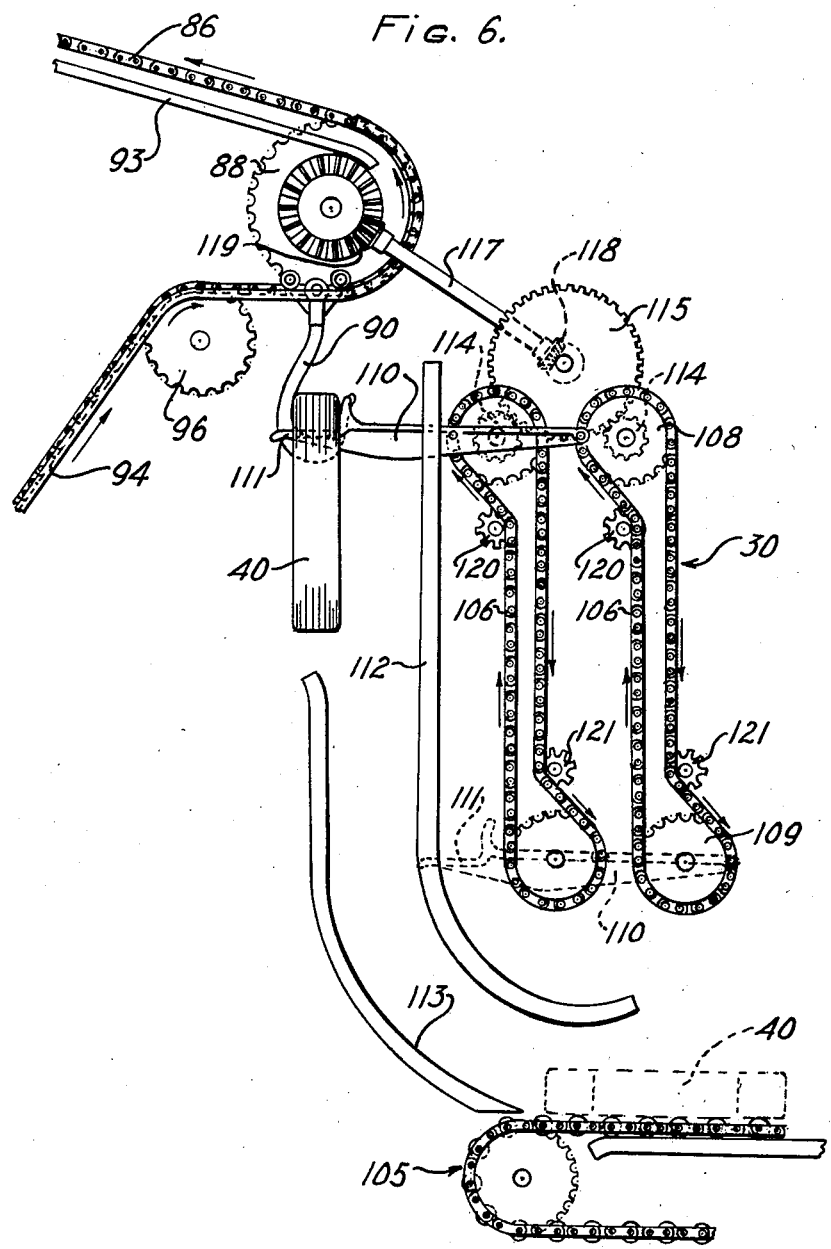

1,951,400

UNITED STATES PATENT OFFICE 1,951,400

CONVEYER SYSTEM

James J. Dvorak, Chicago, Ill., assignor to Western Electric Company, Incorporated, New York, N. Y., a corporation of New York Application November 1, 1930, Serial No. 492,645

6 Claims. (Cl. 198—177)

This invention relates to conveyer systems, and more particularly to conveyer systems for handling toroidal articles, such as coils of wire, wire rod, and/or the like.

An object of the invention is to provide a conveyer system whereby articles may be expeditiously handled and conveyed with a minimum amount of manual effort.

The invention contemplates the provision of a conveyer system, wherein articles received at indefinite intervals are advanced at definite intervals to a predetermined loading station by an endless conveyer operating in synchronism with a loading elevator which receives the articles from the loading station, the elevator having a carrier arm maintained constantly in a predetermined relative position. In one specific embodiment the conveyer system transports coils of wire rods from a rod rolling mill to a wire drawing mill and through an intermediate treating process, such as a pickling bath. A horizontal coil synchronizing conveyer is arranged to receive the coils from the rod rolling mill at indefinite intervals and is adapted to synchronize and advance them at definite intervals to selected predetermined loading stations. At each of these stations a coil loading elevator is arranged to transfer the coils to a pickling conveyer which carries them through a pickling bath, after which they are transferred by means of a coil unloading elevator to a flight conveyer which delivers them to the wire drawing mill. The loading and unloading elevators each consists of a coil carrying arm carried by a plurality of endless belts movable in parallel vertical paths and arranged to constantly maintain the coil carrier arm horizontal.

A more complete understanding of the invention will be had from the following detailed description when read in conjunction with the accompanying drawings, wherein Fig. 1 illustrates schematically a conveyer system embodying the features of the invention;

Figs. 2 and 3 are plan and elevational views, respectively, of the coil synchronizing conveyer;

Fig. 4 is a fragmentary section on line 4—4 of Fig. 2;

Fig. 5 is a skeletonized elevational view of the coil loading elevator; and

Fig. 6 is a skeletonized elevational view of the coil unloading elevator.

Referring now to the drawings, and particularly to Fig. 1 thereof, it will be observed that the conveyer system of the present embodiment of the invention comprises a coil synchronizing conveyer 15, a loading elevator 20, a pickling conveyer 25, and an unloading elevator 30. These several units of the system will be described hereinafter in the order in which each performs its particular function.

The coil synchronizing conveyer (Figs. 2, 3 and 4) comprises a horizontal roller platform 38 over which the coils 40, received from the mill at indefinite intervals, are successively advanced to a predetermined position where their movement is arrested by yieldable stop members or arrester shoes 41—41 pivoted at opposite sides of the roller platform. At predetermined intervals, a continuously moving endless conveyer 43, traveling in a central opening 44 in the roller platform, is adapted to advance a coil 40 from its arrested position to one of a plurality of loading positions, where it is released and thereafter received by a loading elevator 20 hereinafter described. Any desired number of loading positions with a corresponding number of loading elevators may be employed, two being provided in the present embodiment of the invention. These positions are indicated in Fig. 2 by the reference numerals 46 and 47, and it will be observed that a coil 40 is shown in dotted outlines at each of these positions.

The conveyer 43 comprises a pair of spaced endless belts or chains 48—48, each arranged to travel around a pair of spaced sprocket wheels 49 and 50 rotatably journaled in the supporting framework of the roller platform, the sprockets 50 being disposed substantially directly below the coil arrester shoes 41 and driven through a train of gears 52 from any suitable source of power (not shown). Pivotally carried by and disposed intermediate the conveyer chains 48 are a plurality of coil engaging members 54, 54 each of which is pivoted intermediate its ends and is formed at one end with a coil engaging portion 55. Flanged rollers 56, carried at the opposite ends of the pivoted members 54, are arranged to ride along one of two adjoining guide rails or cam tracks 58 and 59 to thereby control the positions of the pivoted members as they are advanced by the conveyer 43.

Each of the cam tracks 58 and 59 consists of spaced upper and lower straight parallel portions interconnected at one end by an arcuate shaped portion 60 (Fig. 4) and is constructed and arranged to project the coil engaging portions of the pivoted members 54 outwardly substantially at right angles to the path of the conveyer chains 48. Thus, as the pivoted members 54 approach the upper portion of the cam track, the coil engaging portions thereof are projected into the central opening of the coil, as shown in Fig. 4, whereupon further movement of the conveyer 43 advances the coil from the arrester shoes 41 to one of the loading positions, where it is released or discharged by the cam track 58 or 59 terminating and thereby permitting the coil engaging portion 55 of the pivoted member 54 to drop and pass underneath the coil. The arrester shoes are spread apart by the advancing coil, against the action of coil springs 65—65, which thereafter return the arrester shoes to their normal positions in time to stop and properly locate the next succeeding coil in position to be engaged by the next coil engaging member 54.

It will be understood that the conveyer 43 may be provided with any desired number of coil engaging members 54, four (4) being provided in the present embodiment of the invention and it will be observed that the rollers 56 of alternate members 54 ride along the cam track 58, while the rollers of the intermediate members 54 ride along the cam track 59. Also, it will be noted that the upper portion of cam track 58 terminates substantially directly below coil loading position 46, while the upper portion of cam track 59 terminates substantially directly below coil loading position 47. Thus, coils engaged by members 54 associated with cam track 58 are released or discharged at loading position 46 and those engaged by members 54 associated with cam track 59 are released at loading position 47. In other words, the construction and arrangement is such that the coils of wire are advanced alternately to loading positions 46 and 47.

Associated with the synchronizing conveyer at each of the loading positions 46 and 47 is a loading elevator 20 (Fig. 5), which consists of two or more spaced endless belts or chains 70—70 arranged to travel along parallel vertical coplanar paths around upper and lower sprocket wheels 72 and 73, respectively. A carrier arm 75 is pivotally secured at one point to each of the elevator chains 70 and extends substantially horizontally therefrom. The upper sprocket wheels 72 are driven through similar gears 77—77 from a common drive gear 78, whereby the elevator chains are caused to travel at the same speed to thereby constantly maintain the carrier arm in a horizontal position as it is elevated and lowered by the elevator chains. The drive gear 78 is fixed to a drive shaft 79 driven by any suitable source of power (not shown).

As shown in dotted outlines in Fig. 2, the carrier arm 75 is formed at its outer end with spaced hook portions 80—80 which, during the upward movement of the carrier arm pass through spaced marginal slots 81—81 of horizontal coil supporting plates 82—82 provided in place of the rollers at the loading positions 46 and 47 of the synchronizing conveyer 43. The construction and arrangement just described is such that a coil previously discharged at a loading position of the roller platform is automatically engaged by the hook portions 80 as the latter pass upwardly through the slots 81 of the supporting plate 82. The coil is turned from a horizontal position to a vertical position as it is elevated by the carrier arm 75 along a vertical guide plate 85 (Fig. 5).

At the end of its upward travel, the coil is automatically loaded upon a carrier hook 90 of the pickling conveyer 25, the carrier hook 90 being adapted to pass between the spaced hook portions 80 of the elevator carrier arm 75 as the latter is carried by the elevator chains 70 around the upper sprocket wheels 72. The elevator chains are guided over a series of idler sprockets 91, 92 and 93 disposed near the upper sprocket wheels 72, and arranged to impart the necessary transverse movement to the elevator carrier arm 75 for effecting the loading of the coil upon one of the pickling conveyer hooks 90 and the subsequent withdrawal of the elevator hooks as they are lowered by the elevator chains.

The pickling conveyer 25, shown schematically in Fig. 1, comprises an endless belt or conveyer chain 86 arranged to travel around horizontally spaced sprocket wheels 87 and 88. The carrier hooks 90 are pivotally secured to the conveyer chain 86 at equidistantly spaced positions and are provided with guide or cam rollers 92—92 which ride along upper and lower guide rails or cam tracks 93 and 94, respectively. It will be observed that the lower cam track 94 follows the path of the conveyer chain 86 as it is guided over a series of idler sprocket wheels 96, 96 arranged so that the coils depending from the carrier hooks 90 are carried through a pickling bath contained in a suitable tank 98. The weight of the coil is carried by the lower cam track 94, as will be obvious by referring to Figs. 1 and 5.

The sprocket wheel 87 is driven from the drive shaft 79 of the loading elevator 20 by a chain and sprocket drive 100 (Fig. 5) designed to synchronize the movement of the pickling conveyer chain 86 with the movement of the elevator chains 70 so that the pickling conveyer carrier hooks 90 successively arrive at the loading position of the elevator contemporaneously with the elevator carrier arm 75.

After the coils have passed through the pickling bath, the unloading elevator 30 (Fig. 6) transfers them from the carrier hooks of the pickling conveyer to a flight conveyer 105 of any suitable construction adapted to deliver the coils to the wire drawing mill. The unloading elevator 30 is similar in construction and operation to the loading elevator 20 in that it also comprises two or more endless belts or chains 106—106 arranged to travel along parallel vertical coplanar paths around upper and lower sprocket wheels 108 and 109, respectively. A carrier arm 110 is pivotally secured at one point to each of the elevator chains 106 and extends horizontally therefrom. At its outer end, the carrier arm 110 is formed with a hook portion 111 for receiving a coil from a pickling conveyer hook 90. As the carrier arm 110 approaches the end of its upward travel, the hook portion 111 thereof enters the central opening of a coil depending from a pickling conveyer carrier hook 90, and as the carrier arm continues to move upwardly and around the upper sprocket wheels 108, the coil is disengaged from the pickling conveyer carrier hook 90 and then lowered along a guide plate 112. As the carrier arm approaches the end of its downward travel, the coil is stripped from the hook portion 111 thereof by the guide plate 112 through a traverse movement of the carrier arm, as indicated in dotted outlines in Fig. 6. The coil, thus discharged from the unloading elevator arm, is guided by a chute 113 onto the flight conveyer 105 which delivers it to the wire drawing mill.

The upper sprocket wheels 108 of the unloading elevator are driven through similar gears 114—114 from a common gear 115, whereby the elevator chains 106 are caused to travel at the same speed to thereby constantly maintain the carrier arm 110 in a horizontal position as it is lowered and elevated by the elevator chains. The gear 115 is driven from the sprocket wheel 88 of the pickling conveyer by a shaft 117 and bevel gears 118 and 119 designed to synchronize the movement of the unloading elevator chains with the movement of the pickling conveyer chain so that the pickling conveyer hooks 90 successively arrive at the unloading position contemporaneously with the unloading elevator carrier arm 110. The carrier chains 106 of the unloading elevator are guided over idler sprockets 120 and 121 arranged to impart the necessary transverse movement to the elevator carrier arm 110 to effect the unloading of the coil from the pickling conveyer hook 90 and the subsequent withdrawal of the carrier arm 110 to discharge the coil upon the flight conveyer 105.

From the above description, it will be obvious that by employing a conveyer system embodying the features of the present invention, toroidal articles such as coils of wire and the like, may be handled expeditiously and with a minimum amount of manual effort. It is to be understood, of course, that the invention is not limited to the specific embodiment thereof herein illustrated and described except in so far as is defined by the appended claims.

What is claimed is:

1. In a conveyer system, the combination with an endless conveyer belt having a hook-shaped article carrying member, of an elevator comprising a plurality of endless belts arranged in parallel paths, a carrier secured to corresponding portions of all of the elevator belts, and means for synchronously operating the conveyer belt and the elevator belts to cause the load engaging portions of the hook-shaped carrying member and the carrier to pass into and out of article transferring coincidence.

2. In a conveyer system, the combination with an endless conveyer belt having a plurality of hook-shaped article carrying members, of an elevator comprising a plurality of endless belts, a plurality of carriers, each of which is secured in substantially horizontal position to all of the elevator belts, and driving means interconnecting the conveyer belt and the elevator belts for synchronously operating them to cause each hook-shaped article carrying member to move into load transferring coincidence with an advancing carrier.

3. In a conveyer system, the combination with an endless conveyer belt having a hook-shaped article carrying member, of an elevator comprising a plurality of endless belts, a carrier secured to corresponding portions of all of the elevator belts in substantially horizontal position, means for synchronously operating the conveyer belt and the elevator belts, and means comprising sprockets for defining a path of the elevator belts to effect article transferring coincidence of the carrier and the hook-shaped member, and for causing subsequent withdrawal of the carrier to clear the path of the hook-shaped member.

4. In a conveyer system, an elevator including a plurality of endless chains located in a single plane and movable in predetermined parallel coplanar paths, a load engaging member pivotally secured to corresponding portions of all of the chains, a load guiding member having an elongated aperture through which the load engaging member may extend and move for transporting a load, the paths of the chains being arranged to withdraw the loading engaging member through the aperture and from engagement with a load at predetermined intervals.

5. In a conveyer system, an elevator including a plurality of endless chains located in a single plane and movable in predetermined parallel coplanar paths, upper and lower sprockets for guiding the chains, the lower sprockets having their axes laterally displaced with respect to the axes of the upper sprockets, a load engaging member pivotally secured to corresponding portions of all of the chains, a load guiding member mounted adjacent to the chains and having an aperture coextensive with the path of the load engaging members and in alignment therewith, the load engaging member being of sufficient length to extend through the aperture in the guiding member during the major portion of its travel, and to be withdrawn as its pivot points pass around the sprockets farthest from the guide member.

6. In a conveyer, a platform having a station for receiving articles at indefinite intervals of time and having a plurality of loading stations spaced from the receiving station, an endless conveyer movable from the receiving station to all of the loading stations, a plurality of guide rails adjacent to the conveyer and extending from the receiving station to the loading stations, one of the guide rails terminating at each loading station and a plurality of article engaging members pivotally carried by the conveyer, each of the article engaging members having a portion engageable with one of the guide rails to effect the release of articles at the loading stations as determined by the lengths of the guide rails.

JAMES J. DVORAK.